(12) United States Patent
Alhakimi et al.

(10) Patent No.: US 10,160,854 B1
(45) Date of Patent: Dec. 25, 2018

(54) HYDROGEL MATERIALS

(71) Applicant: GL Chemtec Vision Inc., Oakville, ON (CA)

(72) Inventors: Gamil Alhakimi, Oakville (CA); Lisa H. Studnicki, Oakville (CA); Jay F. Kunzler, Canandaigua, NY (US)

(73) Assignee: GL Chemtec Vision Inc. (CA)

( * ) Notice: Subject to any disclaimer, the term of this patent is extended or adjusted under 35 U.S.C. 154(b) by 2 days.

(21) Appl. No.: 15/224,892

(22) Filed: Aug. 1, 2016

Related U.S. Application Data

(60) Provisional application No. 62/200,362, filed on Aug. 3, 2015.

(51) Int. Cl.
*G02B 1/04* (2006.01)
*C08L 39/06* (2006.01)
*C08F 226/10* (2006.01)

(52) U.S. Cl.
CPC ............ *C08L 39/06* (2013.01); *C08F 226/10* (2013.01); *G02B 1/043* (2013.01)

(58) Field of Classification Search
CPC ...................................................... G02B 1/043
See application file for complete search history.

(56) References Cited

U.S. PATENT DOCUMENTS

| | | | |
|---|---|---|---|
| 5,321,108 A | 6/1994 | Kunzler et al. |
| 5,387,662 A | 2/1995 | Kunzler et al. |
| 5,449,729 A | 9/1995 | Lai |
| 5,539,016 A | 7/1996 | Kunzler et al. |
| 7,074,873 B2 | 7/2006 | Lai et al. |
| 7,176,268 B2 | 2/2007 | Lai et al. |
| 7,528,208 B2 | 5/2009 | Schorzman et al. |
| 8,377,464 B2 | 2/2013 | Linhardt et al. |
| 8,389,597 B2 | 3/2013 | Blackwell et al. |
| 9,039,174 B2 | 5/2015 | Awasthi et al. |
| 2014/0100291 A1* | 4/2014 | Chang .................. C08F 230/08 514/772.4 |

FOREIGN PATENT DOCUMENTS

JP           61112161 A  *  5/1986  ............. G03G 9/131

OTHER PUBLICATIONS

English machine translation of Mori (JP 61-112161), translated Dec. 20, 2017.*

* cited by examiner

*Primary Examiner* — Michael F Pepitone
(74) *Attorney, Agent, or Firm* — Drinker Biddle & Reath LLP

(57) ABSTRACT

A dual reactivity crosslinking agent of formula I having at least two different reactive sites, and hydrogel materials prepared from at least two monomers with different rates of free-radical polymerization reactivity. The crosslinking agent includes at least one free-radical reactive site for vinyl-containing monomer and at least one free-radical reactive site for meth(acrylic)-containing monomer. The hydrogel materials are useful in the manufacture of biocompatible medical devices, for example, hydrogel materials having desirable physical properties useful as contact lens materials.

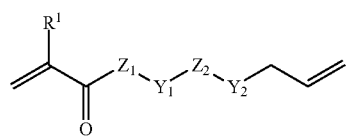

21 Claims, No Drawings

HYDROGEL MATERIALS

RELATED APPLICATION

This application claims benefit of U.S. provisional application No. 62/200,362 filed Aug. 3, 2015 under 35 U.S.C. § 119(e), the disclosure of which is incorporated herein by reference in its entirety.

FIELD OF INVENTION

This invention is directed to hydrogel materials that are useful in the manufacture of biocompatible medical devices, for example, hydrogel materials having desirable physical properties for use as a contact lens.

BACKGROUND OF THE INVENTION

Hydrogels are hydrophilic polymers that absorb water, and are essentially insoluble in water at physiologic temperature, pH, and ionic strength due to the presence of a three-dimensional polymeric network. The three-dimensional network includes crosslinks between polymer chains of the network, and these crosslinks can be formed by covalent bonds, electrostatic, hydrophobic, or dipole-dipole interactions. The hydrophilicity of the hydrogel materials is in large part due to the presence of hydrophilic groups, including, but not limited to, hydroxyl, carboxyl, acid, amide, sulfonic or phosphonic groups, in some instances, along the polymer backbone, and in other instances, as functional side groups that extend from the polymer backbone. Generally, a hydrogel is a crosslinked polymer that absorbs water to an equilibrium value of at least 10% water. The water-swollen equilibrated state of a hydrogel results from a balance between an osmotic force that drives the water to enter the hydrophilic polymer network, and a cohesive force exerted by the polymer chains in resisting expansion. In some fashion, both the osmotic force and the cohesive force correlates with the type of monomers used to prepare the hydrogel polymeric material and the crosslink density of the polymeric hydrogel material. In general, a person of ordinary skill would expect a greater degree of crosslinking for a given hydrogel polymeric material will result in a corresponding decrease in water content, i.e., at equilibrium, the weight percentage of water absorbed by the polymeric network under physiological conditions relative to its total (dry plus water) weight. Water content (%) is simply $\{[\text{wet lens (g)} - \text{dry lens (g)}]/\text{wet lens (g)}\} \times 100$ at equilibrium.

Hydrogels can be classified as synthetic or natural according to their origin; degradable or stable depending on their stability characteristics, and intelligent or conventional depending on their ability to exhibit significant dimensional changes with variations in pH, temperature or electric field. One class of conventional synthetic hydrogels is prepared by free-radical polymerization of vinyl or (meth)acrylate monomers. Several important classes of monomers are recognized by persons of skill with an interest to prepare hydrogel polymeric materials. There are the neutral monomers, for example, but not limited to, methacrylates and acrylates, e.g., 2-hydroxyethyl methacrylate (HEMA), acrylamide/methacrylamides, e.g., dimethyl acrylamide (DMA), glycerol methacrylate (GMA) and cyclic lactams, e.g., N-vinyl-2-pyrrolidone (NVP). At times, the term N-vinylpyrrolidone is used interchangeably with N-vinyl-2-pyrrolidone, and both chemical terms are well recognized by persons of ordinary skill to mean the same vinyl monomer. Another class of monomers is the ionic or charged (under physiological conditions) monomers, including, but not limited to, methacrylic acid, acrylic acid, methylpropylsulfonic acid and p-styrene sulfonate. Typically, in the making of contact lenses the ionic class of monomer is present at low concentration relative to the neutral class of monomer, but the former can have a dramatic effect on water content of the material. The ionic functionality in a buffered saline environment can significantly increase the water content of a hydrogel. For example, copolymerization of 2% w/w methacrylic acid with HEMA results in a hydrogel possessing a water content of 60% (compared with 38% water content for HEMA alone). As used herein "(meth)" refers to an optional methyl substitution. Thus, a term such as "(meth)acrylate" denotes both methacrylic and acrylic radicals.

Hydrogel materials prepared with vinyl cyclic lactams. e.g., N-vinyl-2-pyrrolidone (NVP) can have relatively high water content, and thus, an acceptable level of oxygen permeability. For example, NVP is often copolymerized with an alkyl acrylate or methacrylate such as methyl methacrylate to provide lens materials that typically have a water content of 50% to 80% by weight. However, such copolymers are difficult to synthesize in a controlled manner because of the difference in their respective rates of polymerization between the N-vinyl groups of NVP and the acryloyl or methacryloyl groups of the alkyl acrylate or methacrylate. During free-radical polymerization, the methacrylate monomers polymerize relatively quickly while the vinyl cyclic lactam monomer polymerize more slowly, and therefore, only small amounts of the two comonomers actually react with the other. What one finds is that the polymer network is essentially an interpenetrating network of poly(vinyl monomer) and poly((meth)acrylate)). The result is often a phase separation and a corresponding decrease in the transparency of the polymeric lens material, or the mechanical properties of the lens material deteriorates as the lens absorbs water.

It is also observed, and not to be overlooked, that in a conventional poly(vinyl monomer) and poly((meth)acrylate)) hydrogel framework a minimum of crosslinking occurs between the two essentially homopolymers. In the absence of a suitable crosslinking agent to link the two dual phase polymers, high levels of extractables and dimensional instability results. There have been attempts to design cross-linking agents that address this technical issue. See, U.S. Pat. No. 5,449,729 (Lai, et al), which discloses the use of a crosslinking agent containing both methacrylate and vinyl carbonate reactivity. However, technical issues such as cost to synthesize, toxic preparatory chemistry as well as the relative instability of the vinyl carbonate functionality has limited the development of this dual reactive crosslink agent.

There have been attempts to prepare high water content hydrogels using two different crosslink agents, i.e., allyl methacrylate (AMA) or divinylethylene urea (DVEU), to incorporate the vinyl (cyclic lactam) monomer into the hydrogel polymer network. The AMA crosslink agent works quite well with monomers systems where a fast polymerizing (meth)acrylate and a slow NVP are used. The technical issue with AMA is that it is too volatile and can volatilize during the thermal cure of the polymer resulting in inconsistent levels of crosslinking from one polymerization to the next. Also, DVEU is not a an optimal crosslinking agent because it possesses the same reactivity on the same molecule, and seems to limit the mobility of the poly(NVP) within the hydrogel framework. For example, as films or lenses are being made, or as water enters the framework, the resulting hydrogel material can exhibit loss of lubricity at the surface of the hydrogel. For application of a contact lens, the loss of lubricity is believed to be detrimental to the sensed comfort a consumer will experience in wearing the lens.

Silicone hydrogels combine the high oxygen permeability of polydimethylsiloxane and the excellent water absorption characteristics of a hydrogel. However, for the application of a contact lens, one well known issue with preparing silicone hydrogels is that silicone based monomers are hydrophobic, and relatively, incompatible in regards to forming a homogeneous polymerization mixture with the hydrophilic monomers present in the mixture. The copolymerization of (meth) acrylate functionalized silicones with hydrophilic monomers generally results in opaque, phase separated materials. Technical approaches to minimize such mix incompatibility can include the use of a solubilizing co-solvent or incorporating hydrophilic groups to the silicone backbone.

The design of a silicone hydrogel involves several important considerations. The development involves not only the design of a material possessing excellent physical properties such as modulus, tear strength, and oxygen permeability, but also the design of a material possessing excellent wetting and lubricity without the use of a secondary plasma treatment to impart wettability. The first silicone hydrogels that were commercially introduced in the mid 1990's utilized a plasma treatment to render the surface wettable. This technique is extremely costly and provides marginal clinical performance. Another approach makes use of hydrophilic molds for casting.

A next generation silicone hydrogel material included the addition of a high molecular weight, hydrophilic polymer directly mixed in with the monomer mix formulation. See, McCabe et al. (U.S. Pat. Nos. 6,822,016 and 7,052,131). McCabe takes a somewhat different approach to incorporating poly(NVP). McCabe describe a process of making a polymeric, ophthalmic lens material from a high molecular weight hydrophilic polymer and a silicone monomer. The McCabe process polymerizes the silicon monomer in the presence of an already formed hydrophilic polymer, e.g., poly(NVP) having a molecular weight of no less than about 100,000 Daltons.

Still another approach relies upon the use of a dual phase or a dual network polymerization. The wetting of the latter hydrogel material is achieved through the selective use of monomers with very different reactivity rates as described above, and is often referred to as dual-phase, dual network, or bi-phase polymerization. It is when two or more free-radical, vinyl monomers with two very different reactivity rates provide for a polymer of essentially two homopolymers. The reactivity of the monomers allows for the fast and complete polymerization of the methacrylate functionality followed by NVP. Through careful control of the polymerization rate and degree of crosslinking, high molecular weight poly vinyl pyrrolidone (PVP) chains embedded within a silicone mesh are created. The PVP chains are essentially free to migrate within the silicone matrix and, and in an aqueous environment, are driven to the surface of the lens resulting in good wetting and lubricity. This has been an important discovery in the ophthalmic filed, and it has allowed for improved wetting of a contact lens without the need for plasma or other complicated surface-treatment processes.

The use of the dual phase polymerization has been described several times in the patent literature. It has been used by various research groups for cast molded silicone hydrogel lenses and was first described in a series of U.S. Pat. Nos. 5,387,662, 5,539,016 and 5,321,108, and later in U.S. Pat. Nos. 7,176,268, 7,074,873. In these systems a fast polymerizing methacrylate based silicone is copolymerized with NVP. Recently, U.S. Pat. No. 7,528,208 describes the dual phase polymerization of a monofunctional silicone with NVP. The technical issue with this material, however, is that the crosslinker used for this system is ineffective in maintaining poly(NVP) within the silicone polymer network. This leads to high extractables and poor dimensional stability. U.S. Pat. No. 9,039,174 describes the use of a dual phase polymerization in which a methacrylate based silicone reacts with NVP resulting in a hydrogel material of reported good wetting and lubricity. It is also reported, that a discrete network of PVP can be seen within a silicone network using SEM.

SUMMARY OF THE INVENTION

A composition comprising at least one (meth)acrylic monomer, at least one vinyl containing monomer and a crosslink agent of formula I

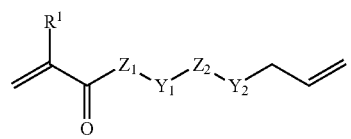

wherein:
R$^1$ is hydrogen or methyl;
Y$_1$ and Y$_2$ are independent of one other is a linkage selected from the group consisting of a direct bond, O, NR$^a$, C(O), C(O)NR$^a$, NR$^a$C(O), OC(O)NH, NHC(O)O, NR$^a$C(O)NH, NHC(O)NR$^a$, C(O)O, OC(O), NHC(O)NHZ$_0$—NH—C(O)NH, OC(O)NHZ$_0$—NH—C(O)O, OC(O)NHZ$_0$—NH—C(O)NH, and NHC(O)NHZ$_0$—NH—C(O)O; where R is H, C$_1$-C$_4$ alkyl or C$_1$-C$_3$ alkanol, and Z$_0$ is a linear or branched C$_2$-C$_{12}$ alkylene divalent radical, or a C$_5$-C$_7$ cycloaliphatic divalent radical, each of which can optionally include one or more linkages of O, NR and C(O); and
Z$_1$ and Z$_2$ are independent of one other is selected from the group consisting of a direct bond, a C$_1$-C$_{12}$ unsubstituted or substituted, linear or branched alkylene divalent radical, where each alkylene divalent radical can optionally include one or more linkages of O, NR$^a$, and C(O), an unsubstituted phenylene divalent radical, a C$_5$-C$_7$ cycloaliphatic divalent radical, and a C$_7$-C$_{12}$ arylakylene divalent radical, with the proviso that at least two of the groups Y$_1$, Y$_2$, Z$_1$ and Z$_2$ is not a direct bond.

The invention is also directed to a composition comprising at least one (meth)acrylic monomer, at least one vinyl containing monomer and a crosslink agent of formula II

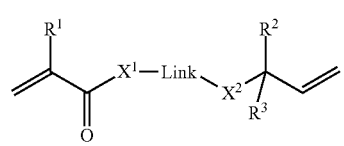

wherein

R$^1$, R$^2$ and R$^3$ are the same or different, and are independently selected from the group consisting of H, C$_1$-C$_6$ alkyl, C$_1$-C$_3$ alkoxy, C$_1$-C$_3$ alkanol, and OH;

X$^1$ and X$^2$ are the same or different, and are independently selected from O, C(O) or NR$^a$, wherein R$^a$ is hydrogen, C$_1$-C$_4$ alkyl or C$_1$-C$_3$ alkanol; and Link is any aliphatic diradical with 2 to 20 carbon atoms that is optionally substituted with one or more atoms of oxygen, sulfur, nitrogen or silicon in the aliphatic chain, wherein if the aliphatic chain is substituted with a siloxane the carbon atoms of the siloxane are in addition to the 2 to 20 carbon atoms of the aliphatic diradical.

The invention is also directed to a biomedical device, e.g., a contact lens, comprising a hydrogel polymer prepared from the composition comprising at least one (meth)acrylic monomer, at least one vinyl containing monomer and a crosslink agent of formula I or formula II.

The composition comprising at least one (meth)acrylic monomer, at least one vinyl containing monomer and a crosslink agent of formula I, or formula II, is particularly suited for making a daily disposable, hydrogel contact lens as well as a silicone hydrogel custom contact lens.

DETAILED DESCRIPTION OF THE INVENTION

This invention overcomes the above technical shortcomings of past attempts to prepare either a conventional hydrogel material or silicon hydrogel material from at least one (meth)acrylate monomer, at least one vinyl monomer, and one or more crosslink agents. The crosslink agents described herein possess dual-reactivity that provides at least some crosslinks between the polymer chains that essentially comprise units of (meth)acrylate monomer and the polymer chains that essentially comprise units of vinyl monomer. This dual-reactive approach allows a person of ordinary skill to tune the hydrogel matrix in which some hydrophilic vinyl polymer chains have a greater ability to move or migrate within the hydrogel polymeric framework than other hydrophilic vinyl polymer chains, particularly in a physiological aqueous environment. In other words, the dual-reactive approach of the crosslink agents is believed to anchor some hydrophilic vinyl polymer chains to the (meth)acrylate polymer chain more strongly than others to create a dimensionally stable, hydrogel polymer framework, and other vinyl polymer chains have relatively greater mobility within the same framework. Moreover, these anchored vinyl chains can be further anchored to the hydrogel framework through additional crosslinks within the (meth)acrylate framework. It is this type of molecular anchoring of hydrophilic vinyl polymer that may explain the observed surface enhancement (wettability and/or lubricity) along with optimal physical properties such modulus of elasticity, oxygen permeability, and a relatively low level of extractables during manufacture—all of which, collectively, must be considered and balanced for a contact lens that a consumer demands in terms of its comfort over at least 16 hours (in the case of a daily replacement lens), or over two to four weeks (in the case of an extended wear lens). The term, physiological aqueous environment, means an aqueous borate-buffered saline (BBS) solution with a pH of 7.4-7.5, a compositional solution well known to a person of ordinary skill in the art of hydrogel materials for medical devices.

In addition, the crosslink agents described herein provide for a relatively consistent hydrogel polymer framework, which is an important commercial consideration in that the hydrogel material can be reproduced within production specifications for a given polymerization monomer mix.

Such consistency is particularly important when it comes to the dimensional stability of the hydrogel matrix over time, e.g., a contact lens should maintain dimensional stability in its packaging for at least three years or more as well as maintain dimensional stability when positioned in the eye. As stated, prior copolymerizations of at least one (meth) acrylate monomer with at least one vinyl monomer and a conventional crosslink agent do not consistently exhibit this level of dimensional stability.

The crosslink agents are designed for dual-phase polymerization as they are designed with dual reactive sites in one agent to polymerize and incorporate both the (meth)acrylate (fast) and vinyl (slow), i.e., monomers of two different free-radical polymerization rates, into a hydrogel polymer framework or network. In the absence of such a crosslink agent, the formed interpenetrating poly(NVP) is too mobile within the hydrogel framework, and as the hydrogel swells in a physiological aqueous environment, the poly(NVP) is released from the framework. Moreover, in the absence of a dual-reactive crosslink agent the resulting hydrogel releases a high level of extractables, e.g., low molecular weight poly(NVP) and oligomers, and one often observes a material with poor dimensional stability.

The crosslink agents also provide a unique morphology using the dual phase polymerization where specific bioinspired functional monomers can be incorporated within the hydrogel polymer framework. Persons of skill in the art of making hydrogel materials generally agree that the dual phase polymerizing results in two separate phases—a methacrylate-based phase and a PVP phase. By polymerizing, for example a fast polymerizing methacrylate phosphaditylcholine (MPC) and a slow polymerizing vinyl phosphaditylcholine carbonate (VPC), each of the two phases can be enriched with the bioinspired polymers. The slow polymerizing VPC is expected to enrich the lens surface (because of its high mobility) and render a highly biocompatible VPC surface. The fast polymerizing MPC is expected to encase the silicone component with a highly hydrophilic polymer, and enhance the wetting and lubricity of the hydrogel surface because even with a dual-phase polymerization some amount of silicone component will always be at or near the surface.

The resulting hydrogels materials possess desirable physical characteristics useful for contact lens materials including a low modulus of elasticity, oxygen permeability, suitable tear strength, a low level of extractables, and inherent wettability or lubricity.

The invention is directed to a crosslink agent of formula I

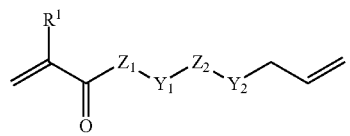

wherein:

R$^1$ is hydrogen or methyl;

Y$_1$ and Y$_2$ are independent of one other is a linkage selected from the group consisting of a direct bond, O, NR$^a$, C(O), C(O)NR$^a$, NR$^a$C(O), OC(O)NH, NHC(O)

O, NR$^a$C(O)NH, NHC(O)NR$^a$, C(O)O, OC(O), NHC(O)NHZ$_0$—NH—C(O)NH, OC(O)NHZ$_0$—NH—C(O)O, OC(O)NHZ$_0$—NH—C(O)NH, and NHC(O)NHZ$_0$—NH—C(O)O; where R$^a$ is H, C$_1$-C$_4$ alkyl or C$_1$-C$_3$ alkanol, and Z$_0$ is a linear or branched C$_2$-C$_{12}$ alkylene divalent radical, or a C$_5$-C$_7$ cycloaliphatic divalent radical, each of which can optionally include one or more linkages of O, NR$^a$ and C(O); and Z$_1$ and Z$_2$ are independent of one other is selected from the group consisting of a direct bond, a C$_1$-C$_{12}$ unsubstituted or substituted, linear or branched alkylene divalent radical, where each alkylene divalent radical can optionally include one or more linkages of O, NR$^a$, and C(O), an unsubstituted phenylene divalent radical, a C$_5$-C$_7$ cycloaliphatic divalent radical, and a C$_7$-C$_{12}$ arylakylene divalent radical, with the proviso that at least two of the groups Y$_1$, Y$_2$, Z$_1$ and Z$_2$ is not a direct bond.

The invention is also directed to a crosslink agent of formula II

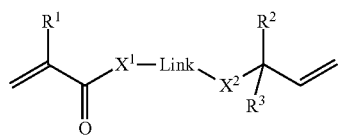

wherein
R$^1$, R$^2$ and R$^3$ are the same or different, and are independently selected from the group consisting of H, C$_1$-C$_6$ alkyl, C$_1$-C$_3$ alkoxy, C$_1$-C$_3$ alkanol, and OH;

X$^1$ and X$^2$ are the same or different, and are independently selected from O, C(O) or NR$^a$, wherein R$^a$ is hydrogen, C$_1$-C$_4$ alkyl or C$_1$-C$_3$ alkanol; and Link is any aliphatic diradical with 2 to 20 carbon atoms that is optionally substituted with one or more atoms of oxygen, sulfur, nitrogen or silicon in the aliphatic chain, wherein if the aliphatic chain is substituted with a siloxane the carbon atoms of the siloxane are in addition to the 2 to 20 carbon atoms of the aliphatic diradical.

In one embodiment, the crosslink agent is of formula IIIa

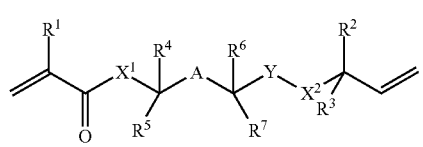

wherein
R$^1$, R$^2$, R$^3$, R$^4$, R$^5$, R$^6$ and R$^7$ are the same or different, and are independently selected from the group consisting of H, C$_1$-C$_6$ alkyl, C$_1$-C$_3$ alkoxy, C$_1$-C$_3$ alkanol, and OH;

A is O, S, CH(R$^b$)$_v$, OCH(R$^b$)$_v$, O(CH$_2$CHR$^b$O)$_v$, (CH$_2$CHR$^b$), or [SiR$^8$R$^9$O]$_w$SiR$^8$R$^9$, wherein R$^b$ is H or C$_1$-C$_4$ alkyl, and R$^8$ and R$^9$ are the same or different, and are independently selected from C$_1$-C$_4$ alkyl or phenyl, and v is from 1-20 and w is from 0 to 60;

X$^1$ and X$^2$ are the same or different, and are independently selected from a direct bond, O or NR$^a$, wherein R$^a$ is hydrogen, C$_1$-C$_4$ alkyl or C$_1$-C$_3$ alkanol; and Y is selected from a single bond, C(O), NR$^a$, C(O)NR$^a$, NR$^a$C(O), OC(O)NH, NHC(O)O, NR$^a$C(O)NH, NHC(O)NR$^a$, C(O)O, or OC(O).

In another embodiment, the crosslink agent is of formula IIIb.

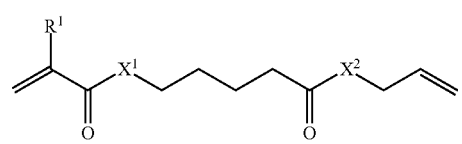

wherein X$^1$ and X$^2$ are the same or different, and are independently selected from O or NR$^a$, wherein R$^a$ is hydrogen, C$_1$-C$_4$ alkyl or C$_1$-C$_3$ alkanol. In one embodiment, both X$^1$ and X$^2$ are O, in another embodiment, X$^1$ is O and X$^2$ is NR$^a$, and still in another embodiment X$^1$ is NR$^a$ and X$^2$ is O.

The invention is also directed to a composition comprising at least one (meth)acrylic monomer, at least one vinyl containing monomer and a crosslink agent of formula I, formula II, or formulae IIIa or IIIb. The crosslink agent includes at least one free-radical reactive site for vinyl-containing monomer and at least one free-radical reactive site for meth(acrylic)-containing monomer. Following polymerization by thermal or photochemical initiation the compositions provide a hydrogel material with a wettable surface, and in many instances, a surface that is enriched with the slow reacting, poly(cyclic lactam) copolymer component.

Although the above described dual-reactive crosslink agents and the dual-phase polymerization can be used with many polymeric systems, of present interest are hydrogel materials, both conventional and silicone hydrogels. In addition, the polymer compositions provide an opportunity to design and plan for a unique morphology using the dual phase polymerization where bioinspired monomers of dual reactivity are simultaneous incorporated with the polymeric network. These hydrogels compositions possess desirable physical characteristics useful for contact lens materials. Such properties include low modulus of elasticity, a high level of oxygen permeability, suitable tear strength, a relatively low level of extractables, and inherent wettability or lubricity.

The composition can also include a crosslink agent that is used to crosslink primarily with the (meth)acrylate monomer in the composition. At times, this second crosslink agent is referred to herein as a (meth)acrylate crosslink agent. Accordingly, a preferred composition will include a dual-reactive crosslink agent of formula I, formula II, or formulae IIIa or IIIb and a (meth)acrylate crosslink agent.

The crosslink agent of formula I, formula II, or formulae IIIa or IIIb is present in the composition from 0.02% to 5.0%/0 by weight, from about 0.05% to about 2.0% by weight, or from 0.08% to 0.8% by weight, based on the weight of the total composition excluding the weight of any diluent present in the composition. In fact, all stated percent by weight of any respective component in the described compositions is based on the total weight of the composition excluding the weight of any diluent present in the composition. If the amount of crosslink agent of formula I, formula II, or formulae IIIa or IIIb is present in an amount of less than 0.02% by weight one or more properties of interest, e.g., dimensional instability can result.

The crosslink agent of formula I, formula II, or formulae IIIa or IIIb that is present in the composition exhibit a manufacturing process advantage over a comparative dual crosslink agent in the art, allyl methacrylate, in that the crosslink agent is significantly less volatile than allyl methacrylate. To demonstrate the relative volatilities, we prepared a monomer hydrogel 1:1 mixture of NVP:HEMA, and to these mixtures we added 1.7% by weight of a crosslink agent of formula IIIb and 1.1% by weight allyl methacrylate. The gas chromatography data below demonstrates a significant loss of ally methacrylate in these mixtures, and no loss (within expt. error) of a formula IIIb crosslink agent at room temperature. As indicated, after three hours at room temperature the NVP:HEMA mixture lost more than 50% by weight of the allyl methacrylate, and virtually no loss of X1-CL-1. The zero loss provides in-part consistent crosslink densities, and therefore, consistent material properties.

| Time (hr) | allyl MA % | XL-CL-1% |
|---|---|---|
| 0 | 1.1 | 1.7 |
| 1 | 0.82 | 1.6 |
| 3 | 0.51 | 1.7 |
| 5 | 0.27 | 1.8 |

As stated, preferred compositions will include a (meth)acrylate crosslink agent to provide the necessary structural stability to the hydrogel polymer framework. Many of these (meth)acrylate crosslink agents are known in the art of hydrogel materials. The (meth)acrylate crosslink agents include, but are not limited to, any one difunctional or multifunctional crosslink agent, and any one mixture thereof. Representative examples of such crosslinkers include, but are not limited to, tripropylene glycerol diacrylate, ethylene glycol dimethacrylate, tetraethylene glycol dimethacrylate, poly(ethylene glycol diacrylate) (PEG400 or PEG600), allyl methacrylate and the like. In addition, diacrylates and dimethacrylates of triethylene glycol, butylene glycol, neopentyl glycol, ethylene glycol, hexane-1,6-diol and thio-diethylene glycol; trimethylolpropane triacrylate, N,N'-dihydroxyethylene bisacrylamide, diallyl phthalate, triallyl cyanurate, divinylbenzene, ethylene glycol divinyl ether, or N,N'-methylene-bis-(meth)acrylamide, sulfonated divinylbenzene, divinylsulfone.

If present, the (meth)acrylate crosslink agent is used in an effective amount to balance the requirement of a structural hydrogel framework with the water content or the inherent wettability of the resulting hydrogel material. The (meth)acrylate crosslink agent is present in the composition from 0.1% to 3% by weight, from about 0.2% to about 1% by weight, or from 0.2% to 0.6% by weight.

In general, to achieve a hydrogel material that includes a proper balance of desired properties, particularly, if the hydrogel material is to be a material for a contact lens, the need for a stable hydrogel polymer framework must be balanced with the wettability and lubricity of the hydrogel surface in a physiological aqueous environment. Accordingly, in the investigation of many different compositions, one generally observes that if the amount of (meth)acrylate crosslink agent exceeded the amount of crosslink agent of formula I, formula II, or formulae IIIa or IIIb, a hydrogel material with the desired balance of properties was observed. Accordingly, in one compositional embodiment, the (meth)acrylate crosslink agent is present in an amount that exceeds the amount of crosslink agent of formula I, formula II, or formulae IIIa or IIIb by at least 2×, preferably at least 3×, up to about 10×, in terms of percent by weight in the composition. Alternatively, in terms of a weight ratio of (meth)acrylate crosslink agent to crosslink agent of formula I, formula II, or formulae IIIa or IIIb, the weight ratio is from 2:1 to 10:1, preferably from 2:1 to 6:1.

The described dual-reactive crosslink agents are particularly designed for hydrogel formulations that include at least one N-vinyl lactam monomer as the at least one vinyl monomer. Illustrative examples of N-vinyl lactams that are present in the hydrogel formulations, include but not limited to, N-vinyl-2-pyrrolidinone (NVP), N-(1-methyl vinyl) pyrrolidinone, N-vinyl-2-piperidone and N-vinyl-2-caprolactam, each of which can be substituted in the lactam ring by one or more lower alkyl groups such as methyl, ethyl or propyl, e.g., N-vinyl-5-methyl pyrrolidinone, N-vinyl-3,3-dimethyl pyrrolidinone, N-vinyl-5-ethyl pyrrolidinone and N-vinyl-6-methyl piperidone. A preferred monomer is N-vinyl-2-pyrrolidinone. Any one of the above N-vinyl lactams can be used alone or in admixture with other lactam monomers to provide hydrogel materials with the properties of interest. Illustrative of the other lactam monomers are, for example, N-vinyl imidazole, N-vinyl succinimide, N-vinyl diglycolylimide, N-vinyl glutarimide, N-vinyl-3-morpholinone and N-vinyl-5-methyl-3-morpholinone.

In a preferred non-silicone hydrogel material, the N-vinyl lactam monomer(s) will be used in conjunction with one or more hydrophobic and/or hydrophilic comonomers. If used in conjunction with a comonomer, the N-vinyl lactam will constitute at least 60% of the copolymer and more preferably from 70% to 90% by weight of the total monomers present in the monomer formulation. Furthermore, the ratio of hydrophobic comonomer to hydrophilic comonomer present in a monomer formulation in preparing the N-vinyl lactam, can be varied as desired to obtain the particular combination of polymer properties desired for the particular application. The preferred amount of N-vinyl lactam in the polymer composition is 70 to 90 percent by weight to achieve a relatively high water content of 70% to 90% by weight.

Water content is measured by individually placing the lens on a piece of premoistened Whatman #1 filter paper. The surface moisture is removed by lightly smoothing a second piece of premoistened Whatman #1 filter paper over the lens. After checking the accuracy of the balance with two known weights, the lens is placed in a tared weigh boat. The wet weight is recorded to the nearest 0.1 mg and the lens transferred to the lens holder, concave side up (this allows the lens identity to be maintained to match wet and dry weights). After the lens holders are full, they are placed on a spindle with a plastic spacer between them and placed in a glass jar approximately ½ full of desiccant. The jar is capped and the lid tightened, then loosened slightly to prevent pressure buildup. The jar with lenses is placed in a 500-650 watt microwave oven along with a 400 ml beaker containing at least 200 ml of distilled water with boiling beads to keep the jar from becoming overheated. The jar is microwaved at 500-650 watts for 10 minutes; the start time and date are recorded on the paperwork. When the cycle finishes, the jar is removed from the microwave and allowed to cool on the bench for 30 minutes; time out and date are also recorded. When cool, the lenses are individually weighed and their dry weights recorded to the nearest 0.1 mg, matching the dry weights to the corresponding wet weight. The water content is expressed as % water according to the following formula: Water Content is [(wet weight−dry weight)/wet weight]×100.

As stated, the (meth)acrylate monomers polymerize very rapidly while the at least one vinyl monomer, polymerizes relatively slowly and fail to effectively copolymerize resulting in a high level of uncrosslinked poly(NVP), the latter of which is released from the hydrogel resulting in a loss of dimensional stability and a loss of surface wettability. The dual-reactive crosslink agents described herein allows one to control the amount of crosslinking of the formed poly(NVP) with the hydrogel network, and in particular the crosslinking with the (meth)acrylate polymers of the network. The control of crosslink density is important because it affects the wettability, lubricity, tear strength, extractables and dimensional stability of the resulting hydrogel material. Due to the dual-reactive sites of the described crosslink agents, the agents form a crosslink between the essentially (meth) acrylate homopolymer and the essentially vinyl homopolymer resulting in hydrogel materials that possess low extractables and excellent dimensional stability.

A hydrogel contact lens prepared with at least 70% by weight of N-vinyl lactam monomer, and a crosslink agent of Formula I, can possess a tear strength of at least 5.8 g/mm, at least 6.0 g/mm, at least 6.2 g/mm, at least 6.4 g/mm, at least 6.6 g/mm, at least 6.8 g/mm, and at least 7.0 g/mm, with each lower limit of tear strength associated with an upper limit of about 9.0 g/mm. The hydrogel contact lens will also possess a water content of at least 65% by weight, at least 68% by weight, at least 71% by weight, at least 74% by weight, at least 77% by weight and at least 80% by weight, with each lower limit of water content associated with an upper limit of about 90% by weight. The hydrogel contact lens will also possess a modulus of elasticity of at least 60 g/mm$^2$, at least 68 g/mm$^2$, at least 76 g/mm$^2$, at least 84 g/mm$^2$, and at least 90 g/mm$^2$, with each lower limit of modulus associated with an upper limit of about 120 g/mm$^2$.

A preferred hydrogel contact lens will possess the following mechanical properties: a tear strength of at least 6.2 g/mm; a water content of at least 71% by weight; and a modulus of elasticity of at least 68 g/mm$^2$.

Another preferred hydrogel contact lens will possess the following mechanical properties: a tear strength of at least 6.4 g/mm; a water content of at least 74% by weight; and a modulus of elasticity of at least 68 g/mm$^2$.

Another preferred hydrogel contact lens will possess the following mechanical properties: a tear strength of at least 6.4 g/mm; a water content of at least 77% by weight; and a modulus of elasticity of at least 76 g/mm$^2$.

The resulting hydrogel materials possess a highly wettable hydrogel "surface" enriched with the slow reacting monomer/polymer component. The dual reactivity approach also allows for the surface enrichment, or exposure, of chemical functionality capable of providing for improved clinical performance. This functionality can be bioinspired in nature. For example, the addition of a monomer with vinyl carbonate phosphadityl choline, which copolymerizes well with NVP, will result in a phosphadityl choline enriched lens surface. Hydrogel materials with this surface functionality are known to exhibit such characteristics as a low affinity for proteins, lipids, and bacteria. In addition, the use of bioinspired fast reacting methacrylate based monomer combined with a silicone based monomer can provide for improved wetting and compatibility with the PVP reacting phase.

The chemistry of hydrogels is well known and there exists a variety of monomers that can be used to make the hydrogel materials. In particular, monomers of interest to the contact lens art include acrylate, acrylamide, methacrylate, methacrylamide, styrene-containing monomers, dimethacrylate and dimethacrylamide monomers, vinyl amide-containing monomers, vinyl carbonate/carbamate/urea monomers, and (meth)acrylate/(meth) acrylamide-capped prepolymers.

All of the above-mentioned monomers and prepolymers may further include polysiloxanes and polyfluorosiloxanes, such as ethylenically terminated methacrylate capped urethane-containing polysiloxane prepolymers, fluorine containing polysiloxanes, polyether containing siloxanes, and polysiloxanes monomers, such as, α,ω-bis(methacryloxybutyl) polysiloxane ($M_2 D_{25}$).

Suitable monomers may be represented by the general formulae

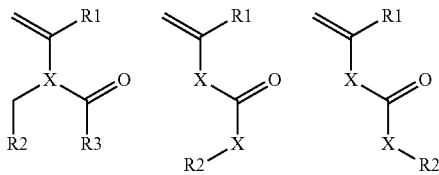

wherein X is O or NR$^a$, where R$^a$ is hydrogen, $C_1$-$C_4$ alkyl or $C_1$-$C_3$ alkanol; R$^1$ is H or CH$_3$; and R$^2$ and R$^3$ are independently hydrogen, a $C_1$-$C_{18}$ alkyl, $C_3$-$C_{18}$ cycloalkyl, $C_3$-$C_{18}$ cycloalkylalkyl, $C_3$-$C_{18}$ cycloalkenyl, $C_5$-$C_{30}$ aryl, $C_5$-$C_{30}$ arylalkyl, $C_1$-$C_{18}$ alkyl siloxysilane or $C_1$-$C_{18}$ alkyl siloxane, each of which can be optionally substituted, linear or branched, or R$^2$ and R$^3$ together with the nitrogen atom to which they are bonded are joined together to form a heterocyclic group.

The vinyl monomers of particular interest in hydrogel systems are vinyl hydrophilic monomers, and in particular, a class of N-vinyl hydrophilic monomer. For example, the vinyl hydrophilic monomer is selected from an N-vinylamide monomer of formula A, a vinyl pyrrolidone of formula B, C or D, or an n-vinyl piperidone of formula E:

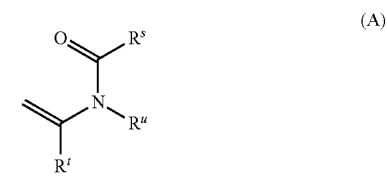

(A)

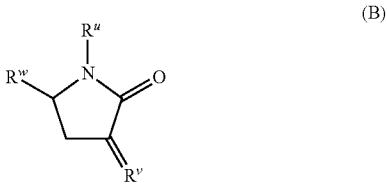

(B)

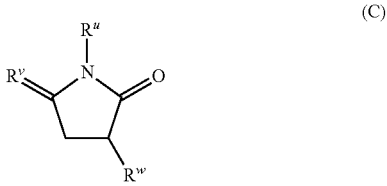

(C)

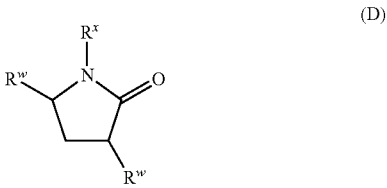

(D)

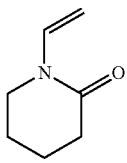

wherein
$R^t$ is H or $CH_3$, and in one embodiment $R^t$ is H;
$R^s$ and $R^w$ are independently selected from H, $CH_3$, $CH_2CH_3$, $CH_2CH_2CH_3$, $C(CH_3)_3$;
$R^u$ is selected from H, $CH_3$, $CH_2CH_3$; and
$R^v$ is selected from $CH_2$, $CHCH_3$ and $C(CH_3)_2$;
$R^x$ is selected from $CH=CH_2$, $CCH_3=CH_2$, and $CH=CHCH_3$.

In one embodiment the hydrophilic vinyl monomer is selected from ethylene glycol vinyl ether (EGVE), di(ethylene glycol) vinyl ether (DEGVE), and the N-vinul monomer includes, but not limited to, N-vinyl lactams, including N-vinyl pyrrolidone (NVP), 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, I-isopropyl-5-methylene-2-pyrrolidone, N-vinyl-N-methyl acetamide (VMA), N-vinyl-N-ethyl acetamide, N-vinyl-N-ethyl formamide, N-vinyl formamide, N-vinyl acetamide, N-vinyl isopropylamide, allyl alcohol, N-vinyl caprolactam, N-2-hydroxyethyl vinyl carbamate, N-carboxyvinyl-3-alanine (VINAL), N-carboxyvinyl-α-alanine and any one mixture thereof.

In another embodiment the slow-reacting hydrophilic monomer is selected from NVP, VMA and 1-methyl-5-methylene-2-pyrrolidone, N-vinyl piperidone, N-vinyl-e-caprolactam, N-vinylimidazolidone, N-vinylsuccinimide, N-vinylformamide and N-vinyl urea, and N-vinylcarbamate. Another vinyl monomer of interest is an O-vinyl carbonate and N-vinyl carbamate that includes zwitterionic functionality such as carboxy betaine and phosphatidyl choline, and mixtures thereof. Because hydrogel materials rich in poly (NVP) have relatively high water content many compositions of interest will include N-vinyl-2-pyrrolidone (NVP), in relatively high concentration, e.g., from 50% to 90% by weight, based on the weight of the total composition excluding the weight of any diluent present in the composition.

The compositions of interest can also include other hydrophilic monomers that are well known in the contact lens art, and include, but not limited to, 2-hydroxyethyl methacrylate (HEMA), glyceryl monomethacrylate (GM) and 2-acrylamido-2-methyl propane sulfonic acid (AMPS). Examples of other hydrophilic monomers useful for polymerization with the vinyl monomer include, but are not limited to, unsaturated carboxylic acids, e.g., acrylic acids, methacrylic acids and the like; (meth)acrylic substituted alcohols, e.g., 3-hydroxypropyl methacrylate, 3-hydroxypropyl acrylate and the like. Still other hydrophilic monomers include the azetidinium and the oxazolone-based monomers disclosed in U.S. Pat. No. 4,910,277.

As noted, the additional hydrophilic monomer are typically (meth)acrylate monomer, and therefore, will preferentially copolymerize with other (meth)acrylate monomer in the composition with a similar free-radical rate of reactivity. Hydrophilic monomer with hydroxyl functionality is of interest because the hydroxyl functionality can provide additional surface wettability of the resulting hydrogel material. A particular monomer of interest is 2-hydroxyl ethyl methacrylate, which can be present in the composition from 5% to 30% by weight. In a preferred composition, the N-vinyl-2-pyrrolidone is present from 30% to 90% by weight, and the 2-hydroxyl ethyl methacrylate is present from 0.5% to 30% by weight.

In the absence of any one silicone-containing monomer, the hydrogels formed are referred to in the art as conventional hydrogels. However, silicone hydrogels is another class of hydrogel materials of importance in the field of medical devices. Accordingly, it can be of interest to include one or more silicone-containing monomers in a composition of interest. Some well known silicone-containing monomers include the TRIS-like and trisiloxane (siloxy silane) monomers represented by the following structures.

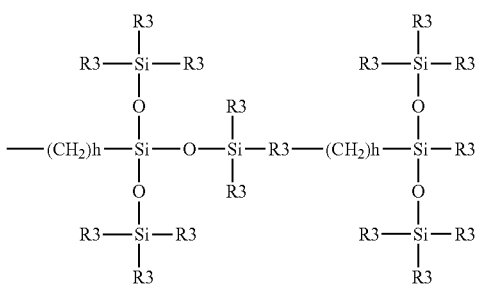

wherein h is 1 to 18 and each $R^3$ independently denotes a lower alkyl radical, or phenyl radical. Representative examples of such acrylate ester and/or methacrylate ester-containing monomers include 3-methacryloyloxypropyltris(trimethylsiloxy)silane or (3-methacryloxy-2-hydroxypropyloxy)propylbis(trimethylsiloxy)-methylsilane), sometimes referred to as TRIS and SIGMA, respectively, and are commercially available from such sources as Gelest, Inc. (Morrisville, Pa.). Other examples of siloxy silanes include, pentamethyldisiloxanyl methylmethacrylate, phenyltetramethyldisiloxanylethyl acrylate, methyldi(trimethylsiloxy) methacryloxymethyl silane, 3-[tris(trimethylsiloxy)silyl]propyl vinyl carbamate, 3[tris(trimethylsiloxy)silyl] propyol allyl carbamate, and 3-tris(trimethylsiloxy)silyl] propyl vinyl carbonate. Additional examples of preferred siloxy silanes include N-[tris(trimethylsiloxy)silylpropyl]-methacrylamide, N-[tris(dimethylpropyl-siloxy)silylpropyl]methacrylamide, N-[tris(dimethylphenylsiloxy)-silyl propyl](meth)acrylamide, N-[tris(dimethylethylsiloxy)silylpropyl](meth)acrylamide, N-(2-hydroxy-3-(3-(bis(trimethylsilyloxy) methylsilyl)propyloxy)propyl)-2-methyl acrylamide, N-(2-hydroxy-3-(3-(bis(trimethyl-silyloxy)methylsilyl)propyloxy)propyl) acrylamide, N,N-bis[2-hydroxy-3-(3-(bis(trimethylsilyloxy) methylsilyl)propyloxy) propyl]-2-methyl acrylamide, N,N-bis[2-hydroxy-3-(3-(bis(trimethylsilyloxy) methylsilyl)propyloxy)propyl] acrylamide, N-(2-hydroxy-3-(3-(tris(trimethylsilyloxy) silyl)-propyloxy)propyl)-2-methyl acrylamide, N-(2-hydroxy-3-(3-(tris(trimethylsilyloxy)silyl)propyloxy)-propyl)acrylamide, N,N-bis[2-hydroxy-3-(3-(tris(trimethylsilyloxy)silyl)propyloxy)propyl]-2-methyl acrylamide, N,N-bis[2-hydroxy-3-(3-(tris(trimethylsilyloxy)silyl)propyloxy)propyl]acrylamide, N-[2-hydroxy-3-(3-(t-butyldimethylsilyl)propyloxy)propyl]-2-methyl acrylamide, N-[2-hydroxy-3-(3-(t-butyldimethylsilyl)propyloxy)propyl]acrylamide, N,N-bis[2-hydroxy-3-(3-(t-butyldimethylsilyl)-propyloxy) propyl]-2-methyl acrylamide, N,N-bis[2-hydroxy-3-(3-(t-butyldimethylsilyl) propyloxy)-propyl]acrylamide, 3-methacryloxy propylpentamethyl disiloxane, 3-methacryloxy-2-(2-hydroxy ethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl)-propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate, trimethylsilylethyl vinyl carbonate, trimethylsilylmethyl vinyl carbonate, and combinations thereof.

Silicone monomers referred in the art as silicone monfunctional monomer can also be included in the described compositions. See, U.S. Pat. No. 8,937,110 to Vanderlaan. Examples of some silicone monfunctional monomer include monomethacryloxyalkyl-polydimethylsiloxane methacrylates selected from the group consisting of monomethacryloxypropyl terminated mono-n-butyl terminated polydimethylsiloxane, monomethacryloxypropyl terminated mono-n-methyl terminated polydimethylsiloxane, monomethacryloxypropyl terminated mono-n-butyl terminated polydiethylsiloxane, monomethacryloxypropyl terminated mono-n-methyl terminated polydiethylsiloxane, N-(2,3-dihydroxypropane)-N'-(propyltetra(dimethylsiloxy)-dimethylbutylsilane) acrylamide, α-(2-hydroxy-1-methacryloxypropyloxypropyl)-o-butyl-decamethyl-pentasiloxane, and mixtures thereof.

In another embodiment the silicone monfunctional monomer is selected from the group consisting of monomethacryloxypropyl terminated mono-n-butyl terminated polydimethylsiloxane, monomethacryloxypropyl terminated mono-n-methyl terminated polydimethylsiloxane, N-(2,3-dihydroxypropane)-N'-(propyl tetra(dimethylsiloxy) dimethylbutylsilane)acrylamide, α-(2-hydroxy-1-methacryloxypropyloxypropyl)-o-butyl-decamethyl-lpentasiloxane, and mixtures thereof.

In another embodiment the silicone monfunctional monomer is selected from acrylamide silicones general formulae (s1) through (s6) below.

The at least one silicone-containing monomer is present in the described compositions in an amount sufficient to provide the desired oxygen permeability. It is a benefit of the present invention that oxygen permeabilities greater than about 60 barrers, greater than about 80 barrer, and in some embodiments greater than about 90 barrer can be achieved. Suitable amounts will depend on the length of the siloxane chain included in the silicone-containing monomers, with silicone-containing monomers having longer chains requiring less monomer. Amounts include from 20% to 60% by weight, and in some embodiments from about 30% to 55% by weight.

In certain silicone hydrogel compositions, one or more of the silicone-containing monomer above are present in a composition from 25% to 80% by weight, or from 20% to 80% by weight. In a preferred composition, the N-vinyl-2-pyrrolidone is present from 50% to 90% by weight, 2-hydroxyl ethyl methacrylate is present from 0.5% to 25% by weight, and the silicone-containing monomer is present from 30% to 70% by weight.

Specific bioinspired monomers include, but not limited to, carboxybetaines, sulfobetains and phosphobetaines, such as methacryloxy phosphatidyl choline (MPC), N-vinylcarboxy ethyl phosphatidyl choline, O-vinyl ethyl phosphatidyl choline carbonate, 1-(3-sulfopropyl)-2-vinylpyridinium betaine, 3-dimethyl(acryloyloxyethyl) ammonium propyl sulfonate, functional sugars and proteins, or any one mixture of bioinspired monomer. Other suitable bioinspired hydrophilic monomers will be apparent to one skilled in the art. The bioinspired monomer is present from 0.5% to 16% by weight or from 2% to 6% by weight.

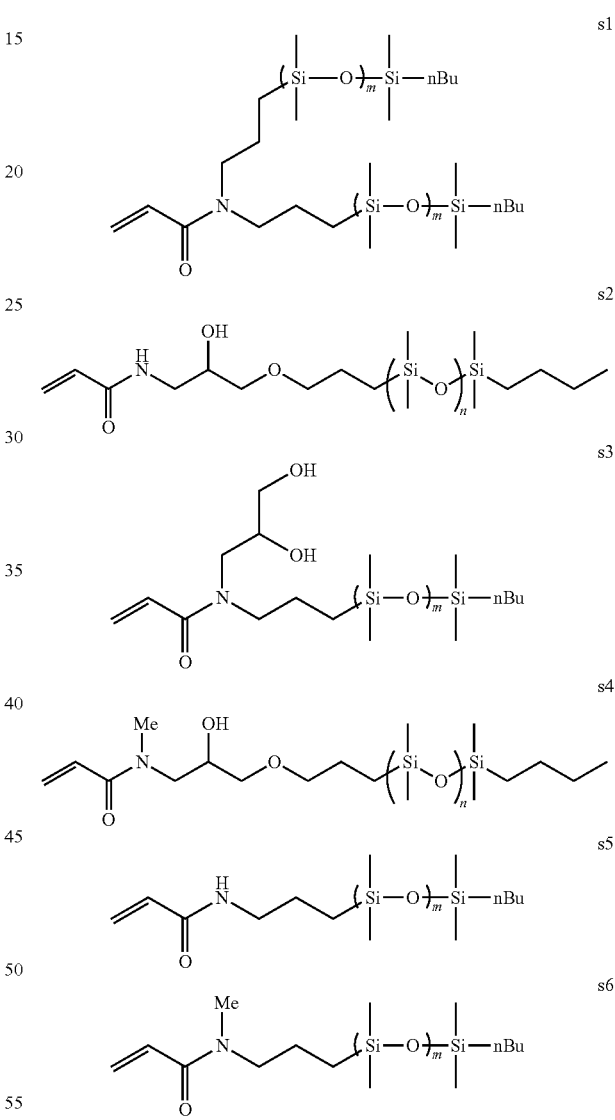

Useful hydrophobic monomers for use herein include, but are not limited to, alkyl acrylates and methacrylates, 4-t-butyl-2-hydroxy cyclohexyl methacrylate (TBE), tert-butyl cyclohexyl methacrylate, isopropylcyclopentyl acrylate, tert-butylcyclohexyl acrylate, isobornyl methacrylate and the like; 2-ethylhexyl methacrylate, 2-phenyloxyethyl methacrylate, partially fluorinated acrylates, partially fluorinated methacrylates and the like and mixtures thereof.

In general, the copolymerization reaction can be conducted neat or with a suitable cosolvent. The monomeric mixture and optional crosslinking agent(s) are combined in the desired ratio, and then exposed to, for example, ultraviolet (UV) light or electron beams in the presence of one or more photoinitiator(s) or at a suitable temperature, for a time period sufficient to form the copolymer. Heat may also be employed to initiate the polymerization in which case a series of Vazo, peroxide or peroxy initiators, well-known in the art, may be used. Suitable reaction times will ordinarily range from about 1 minute to about 24 hours and preferably from about 1 hour to about 10 hours.

The use of UV or visible light in combination with photoinitiators is well known in the art and is particularly suitable for formation of the copolymer. Numerous photoinitiators of the type in question here are commercial products. Photo initiators enhance the rapidity of the curing process when the photo curable compositions as a whole are exposed to, for example, ultraviolet radiation. Suitable photo initiators which are useful for polymerizing the polymerizable mixture of monomers can be commercially available photo initiators. They are generally compounds which are capable of initiating the radical reaction of olefinically unsaturated double bonds on exposure to light with a wavelength of, for example, about 260 to about 480 nm.

Examples of suitable photo initiators for use herein include, but are not limited to, one or more photo initiators commercially available under the "IRGACURE", "DAROCUR" and "SPEEDCURE" trade names (manufactures by Ciba Specialty Chemicals, also obtainable under a different name from BASF, Fratelli Lamberti and Kawaguchi), e.g., "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl)phenyl phosphine oxide] and "DAROCUR" 1173 (2-hydroxy-2-methyl-1-phenyl-1-propan-1-one) and 4265 (the combination of 2,4,6-trimethylbenzoyldiphenyl-phosphine oxide and 2-hydroxy-2-methyl-1-phenyl-propan-1-one); and the like and mixtures thereof. Other suitable photo initiators for use herein include, but are not limited to, alkyl pyruvates such as methyl, ethyl, propyl, and butyl pyruvates, and aryl pyruvates such as phenyl, benzyl, and appropriately substituted derivatives thereof. Generally, the amount of photo initiator can range from about 0.05% w/w to about 5% w/w and preferably from about 0.1% w/w to about 1% w/w.

Examples of suitable thermal initiators for use herein include, but are not limited to, include the azo and peroxy type compounds, such as 2,2-azobisisobutyronitrile (VAZO 64), 4,4-azobis(4-cyanovaleric acid), 1, 1-azobis(cyclohexanecarbonitrile), benzoyl peroxide, 1,1-bis(tert-butylperoxy)cyclohexane, tert-butyl hydroperoxide, tert-butyl peroxybenzoate and dicumyl peroxide. Generally, the amount of thermal initiator can range from about 0.05% w/w to about 5% w/w and preferably from about 0.1% w/w to about 1% w/w.

An organic diluent (solvent) can be included in any one composition of interest. As used herein, the term "organic diluent" encompasses organic compounds which minimize incompatibility of the components in the initial monomeric mixture and are substantially nonreactive with the components in the initial mixture. Additionally, the organic diluent serves to minimize phase separation of polymerized products produced by polymerization of the monomeric mixture.

Also, the organic diluent will generally be relatively non-flammable. Contemplated organic diluents include alcohols such as tert-butanol (TBA), tert-amyl alcohol, diols, such as ethylene glycol; and polyols, such as glycerol. Preferably, the organic diluent is water soluble and can be removed easily through a water extraction process. Other suitable organic diluents would be apparent to a person of ordinary skill in the art.

The organic diluent is included in an amount effective to provide the desired effect (for example, minimal phase separation of polymerized products). Generally, the diluent is included at 0 to 60% by weight of the monomeric mixture, with 1 to 40% by weight being more preferred, 2 to 30% by weight being even more preferred and 3 to 25% by weight being especially preferred.

The compositions described can also include at least one UV absorbing compound. Surprisingly, UV absorbing compounds can have a substantially different impact on the reaction kinetics of the reactive components in the reaction mixtures of the present invention. For example, it has been found that benzotriazoles substantially slow the rate of reaction for NVP and TEGDMA is some systems much more than the reaction rates of the silicone-containing components. In the case of NVP, this is beneficial, as it provides additional processing flexibility and an exceptional balance of properties, including water contents in excess of about 60%, haze values less than about 50%, or less than about 10%, advancing contact angles less than about 60° and Dk's greater than about 80.

When the silicone hydrogel will be used as an ophthalmic device it may be desirable to incorporate a reactive UV absorbing compound in the reaction mixture so that the resulting silicone hydrogel will be UV absorbing. However, in another embodiment non-reactive UV absorbing compounds may be used solely to achieve the desired reaction kinetics. Alternatively solution filters may be used. It is believed that the UV absorbers in the reactive mixtures block incident light below about 370 nm which alters the spectrum of light being imposed on the visible photoinitiator. This tends to reduce the rate of initiation as well as lower the concentration of initiator radicals present, which in turn is believed to have a significant impact on the rate of polymerization of the monomers. Typically, the monomers which are likely to be most significantly impacted are the slowest and fastest. In several of the examples included herein, NVP (slowest) and TEGDMA (the fastest) are the most sensitive to the presence of the UV absorber.

Suitable UV absorbers may be derived from 2-(2'-hydroxyphenyl)benzotriazoles, 2-hydroxybenzophenones, 2-hydroxyphenyltriazines, oxanilides, cyanoacrylates, salicylates and 4-hydroxybenzoates; which may be further reacted to incorporate reactive polymerizable groups, such as (meth)acrylates. Specific examples of UV absorbers which include polymerizable groups include 2-(2'-hydroxy-5-methacrylyloxyethylphenyl)-2H-benzotriazole (Norbloc), 5-vinyl and 5-isopropenyl derivatives of 2-(2,4-dihydroxyphenyl)-2H-benzotriazole and 4-acrylates or 4-methacrylates of 2-(2,4-dihydroxyphenyl)-2H-benzotriazole or 2-(2, 4-dihydroxyphenyl)-1,3-2H-dibenzotriazole, mixtures thereof and the like. When a UV absorber is included, it may be included in amounts between 0.5% and 4% by weight, and suitably between 1% and 2% by weight.

The present invention relates to monomeric formulations useful in the manufacture of biocompatible medical devices. More particularly, the present invention relates to hydrogel formulations capable of polymerization to form polymeric compositions having desirable physical characteristics useful in the manufacture of contact lenses. Such properties include low modulus of elasticity, a high level of oxygen permeability, wettability, lubricity and a low level of extractables.

According to the present process, the non-silicone and silicon containing monomeric mixture, comprising at least one hydrophilic monomer, and an optionally the organic diluent, is shaped and cured by conventional methods such as static casting or spincasting. The invention is applicable to a wide variety of polymeric materials, either rigid or soft. Especially preferred polymeric materials are lenses including contact lenses, phakic and aphakic intraocular lenses and corneal implants although all polymeric materials including biomaterials are contemplated as being within the scope of this invention. Preferred articles are optically clear and useful as a contact lens.

The crosslink agents can be prepared by a ring opening synthetic route using low cost and non-toxic chemistries. Moreover, many of the crosslink agents are stable and non-volatile under common polymerization conditions used in the art. In one embodiment, the reaction of an allyl alcohol with a cyclic ester followed by methacrylation will result in a crosslink agent of interest. See, Scheme I The compositions described herein can be used to make hydrogel materials for a biomedical device such as artificial heart valves, films, surgical devices, vessel substitutes, intrauterine devices, membranes, diaphragms, surgical implants, artificial blood vessels, artificial ureters, artificial breast tissue and membranes intended to come into contact with body fluid outside of the body, e.g., membranes for kidney dialysis and heart/lung machines and the like, catheters, mouth guards, denture liners, ophthalmic devices, and especially hydrogel contact lenses.

As used herein, a "biomedical device" is any article that is designed to be used while either in or on mammalian tissues or fluid, and in one embodiment in or on human tissue or fluids. Examples of these devices include but are not limited to catheters, implants, stents, and ophthalmic devices such as intraocular lenses, punctal plugs and contact lenses.

Lens formation can be by free radical polymerization such as azobisisobutyronitrile (AIBN) and peroxide catalysts using initiators and under conditions such as those set forth in U.S. Pat. No. 3,808,179, incorporated herein by reference. Photoinitiation of polymerization of the monomer mixture as is well known in the art may also be used in the process of forming an article as disclosed herein. Following hydration, the shaped article, for example a lens for custom optics lens, is optionally machined by various processes known in the art. The machining step includes lathe cutting a lens surface, lathe cutting a lens edge, buffing a lens edge or polishing a lens edge or surface. The present process is particularly advantageous for processes wherein a lens surface is lathe cut, since machining of a lens surface is especially difficult when the surface is tacky or rubbery. The described hydrogel materials can also be prepared by film casting.

The examples should not be read as limiting the scope of the invention as defined in the claims. Unless clearly stated otherwise all numerical percentages, e.g., percentage amounts of monomer in a polymerization mixture, are listed as weight percent, supra.

EXAMPLES

All monomer components (both silicone and hydrophilic monomers) were purified before use. Mechanical properties were determined on samples stored in BBS using ASTM Instron methods. Oxygen permeability values were measured using the polarographic probe method. Films were prepared via polymerization between treated glass plates having a suitable inert spacer. The films were extracted in distilled water and/or in 2-propanol, hydrated in borate-buffered saline (pH 7.3) and autoclaved for 30 minutes. Wetting angle was performed via the captive bubble techniques. All of the above methods and analytical techniques are well known to a person of ordinary skill in the art.

Example 1. Synthesis of Allyl 5-Hydroxypentanoate (11

To a flame-dried, 250 mL round bottom flask sodium hydride is added (4.8 g, 60% dispersion in mineral oil, 0.12 mol, 1.2 eq) under $N_2$ atmosphere. The flask is cooled to 0° C. under ice-water bath, and allyl alcohol (50 mL) is added dropwise over 45 minutes, maintaining a slow release of bubble. The solution is stirred at 0° C. for an additional 15 minutes, and valerolactone (9.2 mL, 0.10 mol) is added dropwise. The solution is warmed to room temperature slowly and stirred overnight.

The following day, the solution is cooled to 0° C., and quenched by slow addition of 6 M HCl solution. The solution is extracted with dichloromethane, and the combined organic layers washed with saturated brine solution. The organic layer was then dried, filtered, and solvent evaporated to give the crude product as pale yellow oil, which was purified by column chromatography to give the product as a colourless oil (5.8 g, 37%). $^1$H-NMR (CDCl$_3$, 400 MHz): 5.92 (1H, ddd, J=17.2, 10.4, 5.6 Hz), 5.32 (1H, d, J=17.2 Hz), 5.24 (1H, d, J=10.4 Hz), 4.59 (2H, d, J=5.6 Hz), 3.66 (2H, t, J=6.0 Hz), 2.39 (2H, t, J=7.2 Hz), 1.74 (2H, quint, J=7.2 Hz), 1.57-1.66 (2H, m)

Example 1: Synthesis of allyl 5-(methacryloyloxy)pentanoate (2) or (XL-CL-1)

To a flame-dried, 250 mL round bottom flask is added allyl 5-hydroxypentanoate (2.88 g, 18.2 mmol, 1.0 eq),

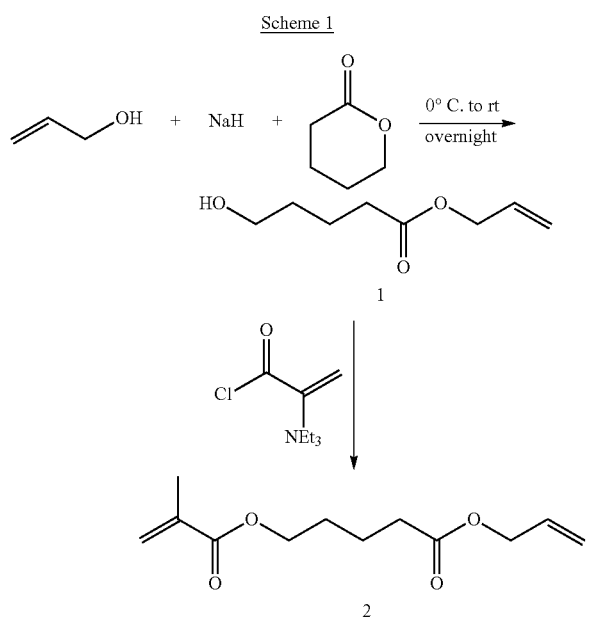

dissolved in dry dichloromethane (85 mL, ~0.2 M), followed with the addition of triethylamine (5 mL, 35.8 mmol, 1.9 eq). To this solution is added methacroyl chloride dropwise, and the solution is stirred at rt for 1 hr. TLC after 1 hr shows a complete conversion of starting material. The solution is quenched with a slow addition of 1 M HCl solution and the organic layer is separated. The aqueous layer is extracted with dichloromethane (2×50 mL), and the combined organic layers washed with saturated brine solution (2×100 mL). The organic layer is dried, filtered, and the solvent evaporated to give a crude product as pale yellow oil, which is purified by column chromatography to give the product as a colourless oil (2.5 g, 61%). $^1$H-NMR (CDCl$_3$, 400 MHz): 6.09 (s, 1H), 5.91 (1H, ddd, J=17.2, 10.4, 5.6 Hz), 5.55 (s, 1H), 5.31 (1H, d, J=17.2 Hz), 5.23 (1H, d, J=10.4 Hz), 4.57 (2H, d, J=5.6 Hz), 4.15 (2H, t, J=6.0 Hz), 2.39 (2H, t, J=6.4 Hz), 1.93 (3H, s), 1.68-1.79 (4H, m).

Example 2. Hydrogel Contact Lenses

Example 2A

Hydrogel contact lenses are prepared with an inventive crosslinker, XL-CL-1. The contact lenses are prepared from a monomer formulation that includes 90 parts N-vinyl pyrrolidone (NVP), 10 parts 4-t-butyl-2-hydroxy cyclohexyl methacrylate (TBE), and 0.25 parts XL-CL-1. The monomer formulation mixture (absent the thermal initiator) was stored at 2-8° C. prior to casting. In a dry box (rel. hum. of approx 10%), and at room temperature, 0.1 part Vazo 64 initiator is added to the formulation mixture until all the initiator is in solution (about 30 minutes). The mixed formulation is added to unpurged polypropylene lens molds in the dry box, and the filled molds are placed in an oven at room temperature and purged with nitrogen for 30 minutes. The nitrogen atmosphere is maintained for the entire cure protocol.

The oven temperature is raised to 60° C. (10° C./min ramp rate) and the temperature maintained at 60° C. for 2 hrs. The oven temperature is raised to 80° C. (10° C./min ramp rate) and the temperature maintained at 80° C. for 2 hrs. The oven temperature is raised to 100° C. (10° C./min ramp rate) and the temperature maintained at 100° C. for 2 hrs. The oven temperature is then lowered to 55° C. over the next hour. The lenses are removed from the oven and allowed to cool to room temperature in the dry box. The lenses are dry released from the molds. Alternatively, the lenses can be wet released from the mold. Dry release or wet release methods are well known to those of ordinary skill in the contact lens art.

Once released from the molds, the lenses are extracted with distilled water (3×/10 min) with exchange of fresh water per cycle. The lenses are extracted with borate-buffered saline (BBS, pH 6.8-7.2, osmolality 270-320), 3×/10 min with exchange of fresh BBS per cycle. In regard to the extraction procedure, the lenses are extracted in beakers using 5 mL fluid/lens per cycle.

As indicated in Table 1, three different sets of lenses are made with each set having four different refractive powers. The hydrogel lenses prepared with near 90% by weight NVP possess unexpectedly high tear strength, particularly for hydrogel lenses with a water content of near 80%.

Example 2B

A monomer mixture is prepared by mixing the following components, NVP (82 parts); TBE (9 parts), XL-CL-1 (0.25 parts), and a Vazo 64 initiator (0.5 parts). The resultant monomeric mixture is cast in a polypropylene contact lens mold and thermally cured in accordance with the procedure of Example 2A.

TABLE 1

Hydrogel Contact Lenses

| Example 2A Lens Set | | 1 | 2 | 3 |
|---|---|---|---|---|
| Dry Release Yield | 8 hr. Stand down (−3.00 PWR) | 83% | 75% | 97% |
| | Regular Casting (−3.00 PWR) | 81% | 79% | 86% |
| | Regular Casting (+6.00 PWR) | 64% | 83% | 69% |
| | Regular Casting (+0.25 PWR) | 67% | 78% | 83% |
| | Regular Casting (+3.00 PWR) | 78% | 81% | 86% |
| Diameter | 8 hr. Stand Down (−3.00 PWR) | 14.678 (0.168) | 14.527 (0.184) | 14.690 (0.272) |
| | Regular Casting (−3.00 PWR) | 14.625 (0.197) | 14.441 (0.103) | 14.485 (0.143) |
| Sag | 8 hr. Stand Down (−3.00 PWR) | 0.179 (0.101) | 0.314 (0.050) | 0.257 (0.075) |
| | Regular Casting (−3.00 PWR) | 0.126 (0.077) | 0.122 (0.062) | 0.093 (0.087) |
| Water Content | | 80.01 | 80.23% | 0.20 |
| Modulus (g/mm$^2$) | | 102 | 103 (3) | 100 |
| Tear Strength (g/mm) | | 69 (0.5) | 74 (0.3) | 66 (0.7) |
| Tensile Strength (g/mm$^2$) | | 102 (38) | 115 (27) | 113 (39) |
| % Elongation (%) | | 127 (53) | 140 (41) | 140 (56) |
| Toughness (g/mm$^2$) | | 82 | 94 (46) | 98 |
| % Gravimetric Extractables | | 22.11 (1.84) | 24.73 (0.71) | 24.74 (0.79) |

As to the properties reported in Table 1, toughness is measured according to ASTM D 790M-86 on 0.5 mm disk samples. Modulus and elongation are measured with the sample immersed in BBS according to ASTM D-1708a with an Instron (Model 4502) instrument; an appropriate size of the sample is gauge length 22 mm and width 4.75 mm, where the sample further has ends forming a dogbone shape to accommodate gripping of the sample with clamps of the Instron instrument, and a thickness of 200+50 microns. Tensile modulus is measured at the initial linear portion of the stress/strain curve per ASTM test method D1708a.

Extractable data is measured as follows. In a clean clear scintillation vial three dry released lenses are placed in a vial and a total lens weight recorded. Distilled water (5 mL) are added to each vial and allowed to extract for 2 hrs at room temperature. The first extractant fluid is removed and an additional 5 mL of water is added to the vial. The lenses are then placed on a Teflon slab and dried under vacuum overnight. Each three lens set is reweighed. The extractables % was determined by the following: Extractables %=[(Dry weight before extraction-Dry weight after extraction)/Dry weight before extraction]*100

The test procedure for measuring tear strength of a hydrogel contact lens is described in U.S. Pat. No. 9,075,187, the disclosure of which is incorporated herein by reference and summarized below. A lens is placed anterior side down on a cutting block, and any excess fluid is removed from the surface at one edge. Teflon tape is attached to the front and back sides of that edge, and the tape is then cut to a rectangle. Once taped the specimen is placed in a Petri dish filled with BBS to rehydrate. The test procedure is as follows:

1. Lower the saline tank on the Instron 4502.
2. Take the specimen out of the saline and cut through the tape approximately 1 mm into the lens beyond the tape to initiate the tear.

3. Mount one side into the upper clamp and the other side into the lower clamp so that the initiated tear is held in tension.
4. Raise the saline tank around the specimen.
5. Allow the specimen to hydrate for at least 30 seconds before starting the test NOTE: Once the specimen is mounted make sure that the load does not read more than 0.1 g. If it is greater than 0.1 g, remove the specimen and rebalance the load until 0.000 g.+−.0.002 is reached. Then replace the specimen in the grips and raise the tank.
6. Using the software control, enter in the specimen thickness and begin the test.
7. Once the first specimen has completed the tear, review the load displacement plot and data to determine if the data should be kept (filed) or rejected. Any gross failures, such as discontinuities in the plot should be rejected. If the first displacement marker is to the left of the first peak in load, then move it to the first peak in load. Repeat for the remaining specimens for the sample batch. The average tear strength and the standard deviation are reported.

Example 2C

A monomer mixture is prepared by mixing the following components, NVP (90 parts); TBE (10 parts), EGDMA (0.3 parts), Pluronics@ F127 dimethacrylate (P127 DM) (Mw. 12600, 2 parts), XL-CL-1 (0.25 parts), and a Vazo 64 initiator (0.5 parts) as described as Example 3 in U.S. Pat. No. 8,389,597. The synthesis of P127 DM is described in U.S. Pat. No. 8,377,464. The resultant monomeric mixture is cast in a polypropylene contact lens mold and thermally cured in accordance with the procedure of Example 2A.

Example 2D

A monomer mixture is prepared by mixing the following components, NVP (82 parts); TBE (9 parts), Pluronics® F127 dimethacrylate (P127 DM) (Mw. 12600, 9 parts), XL-CL-1 (0.25 parts), and a Vazo 64 initiator (0.5 parts) as described as Example 13 in U.S. Pat. No. 8,377,464. The synthesis of P127 DM is also described in U.S. Pat. No. 8,377,464. The resultant monomeric mixture is cast in a polypropylene contact lens mold and thermally cured in accordance with the procedure of Example 2A.

Comparative Example 1

A monomer mixture is prepared by mixing the following components, NVP (90 parts); TBE (10 parts), EGDMA (0.3 parts), Pluronics® F127 dimethacrylate (P127 DM) (Mw. 12600, 2 parts), and a Vazo 64 initiator (0.5 parts) as described as Example 3 in U.S. Pat. No. 8,389,597. The synthesis of P127 DM is also described in U.S. Pat. No. 8,377,464. The resultant monomeric mixture is cast in a polypropylene contact lens mold and thermally cured in accordance with the procedure of Example 2A.

Examples 3 to 5. Silicone Hydrogel Materials

Films were cast from the example formulations 3 to 5 listed in Table 2. Films were cast by casting on treated glass plates using a cure profile of 60° C. for one hour, 80° C. for two hours and 100° C. for two hours. Films were extracted in water and hydrated in borate buffer saline. All of the formulations are cast with the ether monofunctional siloxane (Mono-Si) depicted below with n is 1. All the films were transparent.

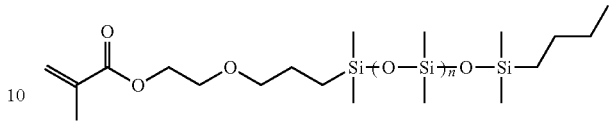

TABLE 2

Silicone Hydrogel Formulations

| Example | 3A | 3B | 4A | 4B | 5 |
|---|---|---|---|---|---|
| Mono-Si | 10 | 10 | 9 | 9 | 25 |
| TRIS | 24 | 24 | 22 | 22 | 15 |
| NVP | 51 | 51 | 46 | 46 | 42.8 |
| HEMA | 15 | 15 | 23 | 23 | 7 |
| Sigma | | | | | 10 |
| XL TEGDMA | 0.5 | 0.5 | | | 0.75 |
| XL-EGDMA | | | 0.5 | 0.5 | |
| XL-CL-1 | 0.1 | 0.1 | 0.1 | 0.1 | 0.1 |
| t-amyl alcohol | 2.5 | 2.5 | 2.5 | 2.5 | 2.5 |
| Vazo 64 | 0.5 | 0.5 | 0.5 | 0.5 | 0.1 |

TABLE 2B

Mechanical properties

| Property | 3A | 3B | 4A | 4B |
|---|---|---|---|---|
| % Ext. IPA | 3.3 | 3.3 | 6.7 | 5.8 |
| Modulus MPa | 0.33 | 0.42 | | 0.45 |
| Tear N/mm | 0.08 | 0.07 | | 0.08 |
| Water Content (IPA Ext. Only) | 58.7 | 56 | 50.6 | 48.3 |
| Contact Angle | 41 | | | 35 |
| Hardness | | 82.5 | | 80 |

Example 6 and Comparative Example 2 (CE2)

Tear Strength Comparison of XL-Cl-1 to Allyl Methacrylate.

The tear strength of several sample films are measured using the Example 3 formulation with three different concentration of XL-Cl-1, Example 6A (0.1%, XL-Cl-1), Example 6B (0.25%, XL-Cl-1), and Example 6C (0.5%, XL-Cl-1). The test results are indicated in Table 3. A comparative formulation (CE2) is also prepared with the Example 3 formulation, but with the XL-CL-1 replaced with 0.25% allyl methacrylate. Accordingly, a direct comparison between a silicone hydrogel film prepared with XL-Cl-1 and allyl methacrylate is considered.

TABLE 3

Tear strength-Average load/thickness (N/mm)

| Test Film | 6A, 0.1% | 6B, 0.25% | 6C, 0.5% | CE2, 0.25% |
|---|---|---|---|---|
| 1 | 0.1349 | 0.0721 | 0.0429 | 0.0536 |
| 2 | 0.1467 | 0.0768 | 0.0471 | 0.0484 |
| 3 | 0.1486 | 0.0758 | 0.0475 | 0.0432 |
| 5 | 0.1672 | 0.0743 | 0.0473 | 0.0448 |
| 6 | 0.1528 | 10.0756 | 0.0481 | 0.0443 |

TABLE 3-continued

| Tear strength-Average load/thickness (N/mm) | | | | |
|---|---|---|---|---|
| Test Film | 6A, 0.1% | 6B, 0.25% | 6C, 0.5% | CE2, 0.25% |
| Average | 0.1483 | 0.0740 | 0.0462 | 0.0459 |
| (g/mm) | (15.1) | (7.5) | (4.7) | (4.7) |
| Stdev. | 0.0113 | 0.0028 | 0.0021 | 0.0044 |

For Example 5 and CE2 tear strength measurements the following procedure is used. The silicon hydrogel films prepared in accordance with Example 3 are further treated in an autoclave at 121° C./15 psi for 30 minutes. All films are tested in a fully water swollen state with the surface dabbed dry with a Kimwipe tissue prior to measurement. The sample size was a 60×10 mm strip with a 15 mm cutting line on one side. An Instron 4411 instrument with a 50N load cell and a crosshead speed of 50 mm/min is used. The tear strength measurements are conducted using Trouser Tear method, ASTM D1938-08 modified for a silicone hydrogel material at 23° C. and 50% rel. humidity. The thickness of each film was measured with a digital micrometer. As indicated, the silicone hydrogel film of Example 5B (0.25% XL-CL-1) has an average tear strength that is about 61% greater than a comparable silicone hydrogel film prepared with allyl methacrylate.

We claim:

1. A composition comprising at least one (meth)acrylic monomer, at least one vinyl containing monomer and a crosslink agent of formula II

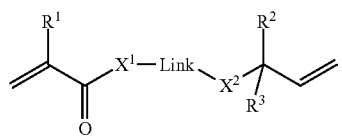

wherein
$R^1$, $R^2$ and $R^3$ are the same or different, and are independently selected from the group consisting of H, $C_1$-$C_6$ alkyl, $C_1$-$C_3$ alkoxy, $C_1$-$C_3$ alkanol, and OH;
$X^1$ and $X^2$ are the same or different, and are independently selected from O, C(O) or $NR^a$, wherein $R^a$ is hydrogen, $C_1$-$C_4$ alkyl or $C_1$-$C_3$ alkanol; and
Link is any aliphatic diradical with 2 to 20 carbon atoms that is optionally substituted with one or more atoms of oxygen, sulfur, nitrogen or silicon in the aliphatic chain, wherein if the aliphatic chain is substituted with a siloxane the carbon atoms of the siloxane are in addition to the 2 to 20 carbon atoms of the aliphatic diradical;
wherein the at least one (meth)acrylic monomer includes a functional monomer selected from the group consisting of carboxybetaines, sulfobetains and phosphobetaines.

2. The composition of claim 1 wherein the at least one vinyl monomer is selected from the group consisting of N-vinyl-2-pyrrolidone, N-vinyl piperidone, N-vinyl-caprolactam,
N-vinylimidazolidone, N-vinylsuccinimide, N-vinylformamide, N-vinyl urea, N-vinylcarbamate, O-vinyl carbonate and any one mixture thereof.

3. The composition of claim 2 wherein the at least one (meth)acrylic monomer includes 4-t-butyl-2-hydroxycyclohexylmethacrylate, and the at least one vinyl monomer includes N-vinyl-2-pyrrolidone.

4. The composition of claim 1 wherein the functional monomer is selected from the group consisting of methacryloxy phosphatidyl choline (MPC), N-vinylcarboxy ethyl phosphatidyl choline, O-vinyl ethyl phosphatidyl choline carbonate, 1-(3-sulfopropyl)-2-vinylpyridinium betaine, and 3-dimethyl(acryloyloxyethyl) ammonium propyl sulfonate.

5. The composition of claim 1 further comprising a silicone monomer selected from the group consisting of Tris-(trimethylsiloxy)-3-methacryloxypropyl methacrylate (Tris),
(3-methacryloxy-2-hydroxypropyloxy) propylbis(trimethylsiloxy)-methylsilane (Sigma), and a mixture thereof, wherein the Tris, Sigma or the mixture thereof is present from 8% to 30% by weight.

6. The composition of claim 1 further comprising 0.2% to 1% by weight of a (meth)acrylate crosslink agent, and the (meth)acrylate crosslink agent is present in terms of a weight ratio of (meth)acrylate crosslink agent to crosslink agent of formula II of from 2:1 to 10:1.

7. The composition of claim 6 wherein the crosslink agent of formula II is present from 0.02% to 0.4% by weight.

8. The composition of claim 2 wherein the at least one vinyl monomer is present from 70% to 90% by weight.

9. The composition of claim 1 wherein the crosslink agent of formula II is a crosslink agent of formula IIIa

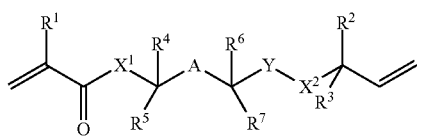

wherein
$R^1$, $R^2$, $R^3$, $R^4$, $R^5$, $R^6$ and $R^7$ are the same or different, and are independently selected from the group consisting of H, $C_1$-$C_6$ alkyl, $C_1$-$C_3$ alkoxy, $C_1$-$C_3$ alkanol, and OH;
A is O, S, $CH(R^b)_v$, $OCH(R^b)_v$, $O(CH_2CHR^bO)_v$, $(CH_2CHR^b)_v$, or $[SiR^8R^9O]_w SiR^8R^9$, wherein $R^b$ is H or $C_1$-$C_4$ alkyl, and $R^8$ and $R^9$ are the same or different, and are independently selected from $C_1$-$C_4$ alkyl or phenyl, and v is from 1-20 and w is from 0 to 60;
$X^1$ and $X^2$ are the same or different, and are independently selected from a direct bond, O or $NR^a$, wherein $R^a$ is hydrogen, $C_1$-$C_4$ alkyl or $C_1$-$C_3$ alkanol; and
Y is selected from a single bond, C(O), $NR^a$, C(O)$NR^a$, $NR^a$C(O), OC(O)NH, NHC(O)O, $NR^a$C(O)NH, NHC(O)$NR^a$, C(O)O, or OC(O).

10. The composition of claim 1 wherein the crosslink agent of formula II is a crosslink agent of formula IIIb,

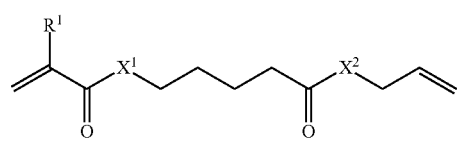

wherein $X^1$ and $X^2$ are the same or different, and are independently selected from O or $NR^a$, wherein $R^a$ is hydrogen, $C_1$-$C_4$ alkyl or $C_1$-$C_3$ alkanol.

11. A composition comprising at least one (meth)acrylic monomer, at least one vinyl containing monomer and a crosslink agent of formula I

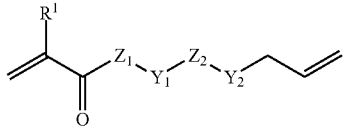

wherein:
R$^1$ is hydrogen or methyl;
Y$_1$ and Y$_2$ are independent of one other is a linkage selected from the group consisting of a direct bond, O, NR$^a$, C(O), C(O)NR$^a$, NR$^a$C(O), OC(O)NH, NHC(O)O, NR$^a$C(O)NH, NHC(O)NR$^a$, C(O)O, OC(O), NHC(O)NHZ$_0$—NH—C(O)NH, OC(O)NHZ$_0$—NH—C(O)O, OC(O)NHZ$_0$—NH—C(O)NH, and NHC(O)NHZ$_0$—NH—C(O)O; where R$^a$ is H, C$_1$-C$_4$ alkyl or C$_1$-C$_3$ alkanol, and Z$_0$ is a linear or branched C$_2$-C$_{12}$ alkylene divalent radical, or a C$_5$-C$_7$ cycloaliphatic divalent radical, each of which can optionally include one or more linkages of O, NR$^a$ and C(O); and
Z$_1$ and Z$_2$ are independent of one other is selected from the group consisting of a direct bond, a C$_1$-C$_{12}$ unsubstituted or substituted, linear or branched alkylene divalent radical, where each alkylene divalent radical can optionally include one or more linkages of O, NR$^a$, and C(O), an unsubstituted phenylene divalent radical, a C$_5$-C$_7$ cycloaliphatic divalent radical, and a C$_7$-C$_{12}$ arylakylene divalent radical, with the proviso that at least two of the groups Y$_1$, Y$_2$, Z$_1$ and Z$_2$ is not a direct bond;
wherein the at least one (meth)acrylic monomer includes a functional monomer selected from the group consisting of carboxybetaines, sulfobetains and phosphobetaines.

12. A hydrogel polymer prepared from the composition of claim 8.

13. The hydrogel polymer of claim 12 with a water content of 65% to 85%, and a tear strength of at least 6.2 g/mm.

14. The hydrogel polymer of claim 13 with a modulus of elasticity of at least 68 g/mm$^2$, and tear strength of at least 6.6 g/mm.

15. The hydrogel polymer of claim 12 with a water content of at least 77% by weight, a tear strength of at least 6.4 g/mm, and a modulus of elasticity of at least 68 g/mm$^2$.

16. A contact lens prepared with the hydrogel polymer of claim 12.

17. A contact lens prepared from a composition comprising at least one (meth)acrylic monomer, at least one vinyl containing monomer, a (meth)acrylate crosslink agent, and a crosslink agent of formula II, wherein a weight ratio of the (meth)acrylate crosslink agent to crosslink agent of formula II is from 2:1 to 10:1

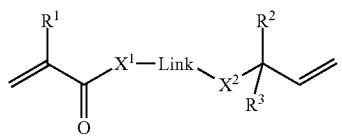

wherein
R$^1$, R$^2$ and R$^3$ are the same or different, and are independently selected from the group consisting of H, C$_1$-C$_6$ alkyl, C$_1$-C$_3$ alkoxy, C$_1$-C$_3$ alkanol, and OH;
X$^1$ and X$^2$ are the same or different, and are independently selected from O, C(O) or NR$^a$, wherein R$^a$ is hydrogen, C$_1$-C$_4$ alkyl or C$_1$-C$_3$ alkanol; and
Link is any aliphatic diradical with 2 to 20 carbon atoms that is optionally substituted with one or more atoms of oxygen, sulfur, nitrogen or silicon in the aliphatic chain, wherein if the aliphatic chain is substituted with a siloxane the carbon atoms of the siloxane are in addition to the 2 to 20 carbon atoms of the aliphatic diradical,
wherein the contact lens has a tear strength of at least 6.2 g/mm, and a modulus of elasticity of at least 68 g/mm$^2$.

18. The contact lens of claim 17 wherein the at least one (meth)acrylic monomer includes a functional monomer selected from the group consisting of carboxybetaines, sulfobetains and phosphobetaines, and the at least one vinyl monomer includes N-vinyl-2-pyrrolidone.

19. The contact lens of claim 17 wherein the crosslink agent of formula II is present from 0.02% to 0.4% by weight, the (meth)acrylate crosslink agent is present from 0.2% to 1% by, a weight ratio of (meth)acrylate crosslink agent to crosslink agent of formula II is from 2:1 to 10:1.

20. The composition of claim 1 wherein the crosslink agent of formula II is a crosslink agent of formula IIIb,

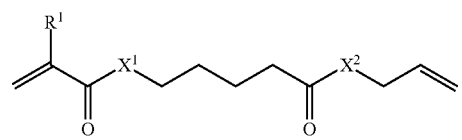

wherein both X$^1$ and X$^2$ are O.

21. The composition of claim 1 wherein the crosslink agent of formula II is a crosslink agent of formula IIIb,

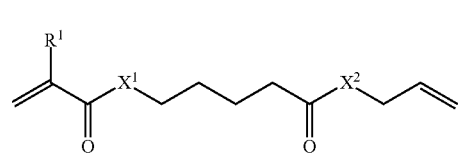

wherein X' is O and X$^2$ is NR$^a$, wherein R$^a$ is hydrogen, C$_1$-C$_4$ alkyl or C$_1$-C$_3$ alkanol.

* * * * *